United States Patent [19]

Buchanan et al.

[11] 4,393,484
[45] Jul. 12, 1983

[54] METHOD OF STACKING SEISMIC DATA

[75] Inventors: David J. Buchanan, Burton-on-Trent; Richard Davis, Ashby-de-la-Zouch; Peter J. Jackson, Boundary, Nr. Burton-on-Trent, all of England

[73] Assignee: Coal Industry (Patents) Limited, London, England

[21] Appl. No.: 193,321

[22] Filed: Oct. 2, 1980

[30] Foreign Application Priority Data

Oct. 19, 1979 [GB] United Kingdom ............... 7936413

[51] Int. Cl.³ .......................... G01V 1/36; G01V 1/20
[52] U.S. Cl. ........................................ 367/23; 367/14; 367/56; 367/59
[58] Field of Search ............... 367/14, 23, 24, 37, 367/56, 58, 59

[56] References Cited

U.S. PATENT DOCUMENTS

| 3,431,999 | 3/1969 | Glazier | 367/59 |
| 3,731,270 | 5/1973 | Penhollow | 367/56 |
| 3,753,222 | 8/1973 | Trostle | 367/56 |
| 3,858,167 | 12/1974 | Stas et al. | 367/36 |
| 4,330,872 | 5/1982 | Bratton | 367/59 |

FOREIGN PATENT DOCUMENTS

| 3015869 | 11/1980 | Fed. Rep. of Germany | 367/56 |
| 1290152 | 9/1972 | United Kingdom . | |
| 1359719 | 7/1974 | United Kingdom | 367/63 |
| 1360282 | 7/1974 | United Kingdom . | |
| 1393602 | 5/1975 | United Kingdom . | |
| 1429244 | 3/1976 | United Kingdom . | |
| 1569582 | 6/1980 | United Kingdom . | |

OTHER PUBLICATIONS

Mason et al., "Channel Wave Mapping of Coal Seams . . . ", 10/29/78, Soc. Explor. Geophys., Meeting, San Fran., Calif.

Primary Examiner—Nelson Moskowitz
Attorney, Agent, or Firm—James Creighton Wray

[57] ABSTRACT

Faults in a mineral seam are located by an in-seam seismic technique which involves locating shots and detectors in the seam and firing the shots sequentially. The detectors pick up the reflections of the shots from faults and a common reflection point is determined by analyzing the seismic traces from the detectors.

7 Claims, 3 Drawing Figures

METHOD OF STACKING SEISMIC DATA

BACKGROUND OF THE INVENTION

This invention relates to a method of stacking seismic data to identify a fault in a geological seam. The invention is particularly, but not exclusively, applicable to locating faults in coal seams.

The advance longwall face method of mining which is typically used in modern coal mines is highly capital intensive. It takes several months to set up a coal face and capital costs are high. A significant proportion of the longwall faces encounter small but serious geological faults. These, almost invariably, disrupt production. In a substantial number of instances, unexpected faulting results in the premature abandonment of faces. Faults usually affect the integrity of a hydraulically supported roof. Faults encountered head-on bring consequential flooding and/or fire risks. Thus, unanticipated faulting can seriously affect the economics of mining and it is therefore highly desirable to know the geological structure of a seam prior to mining.

A number of techniques are available for investigating subsurface geology. Direct methods include borehole drilling, both vertically from the surface, and horizontally from the coal face itself. Indirect or geophysical methods include seismology, resistivity, gravity and borehole geophysical techniques. Of these, seismology, as practiced from the surface of the earth, tells most about the subsurface structure. Large faults may be detected; however, small but vitally important faults can be missed. For this reason seismology is now also applied underground since it is known that a coal seam will guide, or channel seismic waves.

In-seam seismology differs from standard surface seismology in two main respects. Firstly, channel waves are dispersive. The signal from a quasi-impulsive source, e.g. a small explosion, is gradually phase encoded as it propagates. The initial sharp signal spreads out as it travels through the coal. Secondly, the underground environment is harsh. There are very stringent safety regulations in most countries governing the use of equipment under-ground and movement is restricted.

To obtain a viable production system the underground field technique must therefore be made as simple as possible.

The known method of in-seam seismology is to locate geophones in short, horizontal boreholes in the coal seam. Small charges are fired consecutively from other boreholes in the seam. The signals received by the geophones are recorded using a standard seismic recording system with say, 12 channels and a sampling rate of 0.5 ms.

The problem of dispersion can be handled using specialised data processing techniques. As shown in our copending Patent Application No. 86,628, dispersive seismic arrivals can be recompressed to appear as impulse-like events.

Reference has been made above to the standard surface seismology which is used. The information gained by such seismology is subjected to processing by a technique known as Common Depth Point (CDP) stacking. This is a method designed to improve the signal to noise ratio in seismograms and highlights seismic reflectors. CDP stacking is greatly facilitated by using a special field recording technique with predetermined locations for shots and geophones. The improvement in signal to noise ratio arises because the totality of seismic traces is processed to produce a smaller number of improved traces. There is in fact data redundancy because reflection points in the earth may be sampled more than once.

In underground seismology the environment does not permit the luxury of data redundancy. The field technique must be made simple.

Unfortunately, the term 'common depth point' is inaccurate. Only in the case of a horizontal reflector is the term accurate. For a dipping reflector, the term is a misnomer. In such cases CDP stacking puts the reflectors in the wrong spatial positions. It is necessary to migrate the data to correct for this effect. Migration procedures, such as wave equation migration, require large quantities of data if they are to be accurate. In channel wave seismology large quantities of data are not available, and reflectors may occur at any angle of 'dip' to the geophone line. For large dips the standard midpoint gathers are inappropriate.

In surface seismology dispersion of seismic waves is usually neglected, but for in-seam seismology it is vitally important. In co-pending British Patent Application No. 41420/78 it is shown how channel wave data may be recompressed to produce impulse-like events but even when this is done the group and phase velocities remain different. Standard CDP methods do not differentiate between these two velocities.

SUMMARY OF THE INVENTION

It is an object of the present invention to modify the CDP stacking technique to remove or obviate the above difficulties.

Generally, in the present invention, faults in a mineral seam are located by an in-seam seismic technique which involves locating shots and detectors in the seam and firing the shots sequentially. The detectors pick up the reflections of the shots from faults and a common reflection point is determined by analysing the seismic traces from the detectors.

More specifically, according to the present invention a method of stacking seismological data to identify a fault in a geological seam includes the steps of arranging shots and detectors in a seam or the surrounding strata, firing the shots sequentially and detecting any reflections thereof with the detectors, and selecting from the seismic traces those having a common reflection point.

It is preferred that the target is divided into a number of equal length segments and each trace is assigned to the segment which contains the point at which reflections would occur. It is also preferred that the traces belonging to the same line segment are stacked after applying a move out correction according to the formula:

$$P^2 = x_1^2 + x_2^2 + 2x_1 x_2 \cos 2\theta + 4L^2 + 4L(x_1 - x_2) \sin \theta$$

The integers of the equation representing the functions set out hereinafter.

These and other and further objects and features of the invention are apparent in the disclosure which includes the above and below specification and claims and drawings.

BRIEF DESCRIPTION OF THE DRAWINGS

In the accompanying drawings

DETAILED DESCRIPTION OF THE DRAWINGS

Figure 1:
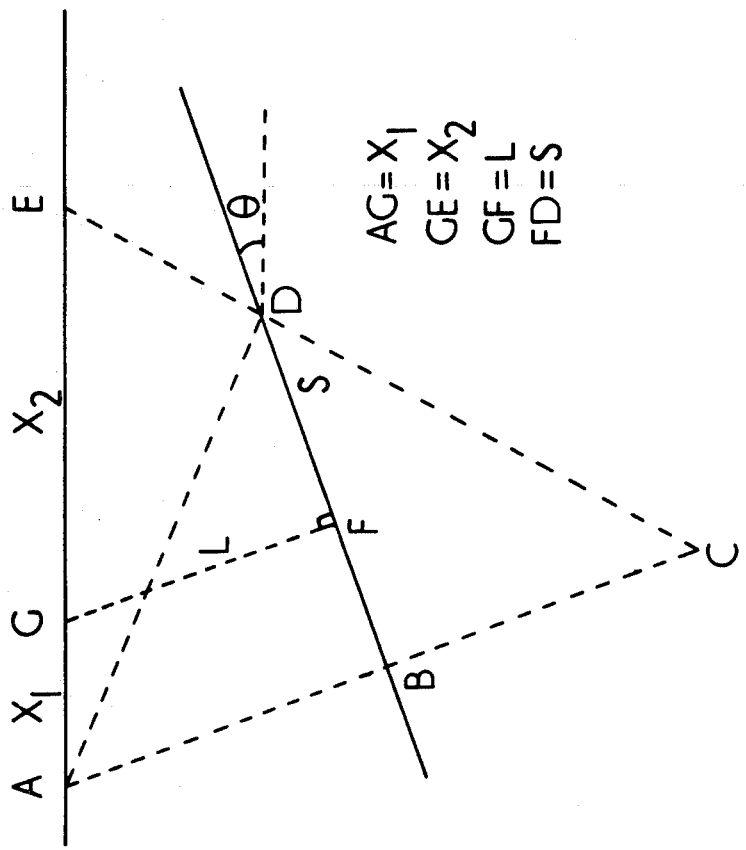
FIG. 1 shows in diagrammatic form the layout of an underground coal seam and FIGS. 2 and 3 show actual traces obtained by applying the method.

Referring first to FIG. 1, this shows a reflector as the full indicated line at a distance L from a shot-geophone line AE, and at an angle $\theta$ to this line. The shot is located at point A and the geophone at point E. For this arrangement the point D is the point of the reflector where specular reflection occurs. The distances $x_1$ and $x_2$ are the distances to shot and geophone respectively from some point of origin, G, on the shot-geophone line. The point F is the foot of the perpendicular line from G to the reflector. The total distance travelled by a wave emanating from A, reflecting at D and being received at E is denoted by p and it is possible to show that $$p^2 = x_1^2 + x_2^2 + 2x_1x_2 \cos 2\theta + 4L^2 + 4L(x_1 - x_2) \sin \theta \quad (1)$$

The distance FD is S where $$S = [x_1x_2 \sin 2\theta - L(x_1 - x_2) \cos \theta]/[2L + (x_1 - x_2) \sin \theta] \quad (2)$$

Normally seismic traces are gathered about the midpoint of AE. In this case $x_1 = x_2 = x$ and equations (1) and (2) become $$p^2 = 4(L^2 + x^2 \cos^2 \theta) \quad (3)$$

$$S = x^2 \sin 2\theta / 2L \quad (4)$$

The case $x = 0$ corresponds to zero offset. Standard CDP stacking applies a transformation to each seismic trace in the stack to produce effectively a zero offset trace. These traces are then summed. Equation 4 gives the difference between the actual reflection point and the zero offset reflection point. In standard surface seismology $x/L$ is usually small and the angle $\theta$ is small. Therefore S is small. That is, all traces in the CDP stack have reflection points near to the zero offset reflection point. It is therefore valid to gather traces with a common midpoint.

For in-seam seismology $x/L$ is much larger, and $\theta$ may take any value. Consequently S is not necessarily small. Traces with quite different reflection points may be stacked if the midpoint is used as the gathering criterion. This effect is overcome by gathering only those traces with similar reflection points.

A target reflector at a certain angle of interest is defined by the processor. This target is subdivided into a number of equal length segments, and each trace is assigned to the segment which contains the point at which reflection would occur. This of course is a dynamic labelling dependent on the target of interest. Those traces belonging to the same line segment are stacked after applying a move out correction given by equation (1). Using this method only traces with similar reflection points are stacked. This technique of gathering traces by their reflection points on a target rules out the normal procedure of sorting traces into gathers before processing. Because trace gathering is target dependent and does not require a certain arrangement of shots and geophones, traces from any combination of shots and geophones may be stacked. Indeed the shots and geophones could be in different mine roadways.

The stack itself may be carried out in distance-distance space, or distance-slowness space. In FIG. 1 the line AE was chosen as a reference for defining the target distance and angle, but of course any convenient line may be chosen as a reference. It is sometimes advantageous to choose the reference line parallel to the target. It is then easy to combine adjacent target segments, either with or without overlapping, to increase the fold of the stack, thus high-lighting targets parallel to the reference line. The system used is referred to as dynamic trace gathering (DTG).

DTG is extremely flexible. It permits targets at any angle to be imaged. The field shooting technique is simplified. There is little data redundancy. One unfortunate consequence of the method is that the coverage on any particular target may be non-uniform and may vary in density along the target. If targets at a certain angle are of particular interest, then it is possible to design the layout of shots and geophones so that coverage and density are uniform along this target. If a target location is already known the method may be used for velocity analysis.

A number of extensions are possible. Firstly, it is not necessary to assume a simple reflection at any target. Mode conversion may occur. If the shot and geophone positions are fixed, and a certain target is is assumed, then it is possible to derive a complicated algebraic equation for the mode conversion point on the target, provided that velocities before and after mode conversion are known, or assumed. An easier computational procedure is to find the conversion point iteratively. The mode conversion point must lie between the feet of perpendiculars dropped from the shot and geophone to the target reflector. As a first estimate, a point midway between the feet is chosen. The ratio of the sines of the angles of incidence and reflection is then compared with the ratio of the velocities to determine the side of the estimated point that the mode conversion point, given by Snell's law, lies. The next estimate is taken as the midpoint of the section of the target to which has been narrowed down the mode conversion point. Thus each iteration will halve the error in the estimate of the mode conversion point. DTG with mode conversion can also be used to analyse data from transmission shooting. If mode conversion takes place at any target between the shots and geophones, then the target will be imaged.

A second extension concerns the use of the method if the group and phase velocities are different. It has previously been shown that even when the group arrival times are equalised by applying a moveout, there is a phase-roll through the traces resulting from the different lengths of travel path. There are two possible methods to accomodate this. Firstly, the envelopes of the traces may be stacked, in which case all phase information is lost and phase-roll becomes irrelevant. Alternatively, a correction can be applied to each trace before the moveout correction and stack. This correction is given by applying the factor $$\exp[iw_c(1 - C_g/C_p)t]$$

throughout each complex trace, where t is the time $C_p$ and $C_g$ are the phase and group velocities at the frequency $w_c$, which is normally chosen to be that where peak power occurs in the frequency band of interest.

Thirdly, if a pair of traces are recorded from one shot by one geophone in orthogonal, horizontal directions, they can be combined to give a resultant signal in any horizontal direction; in particular parallel or perpendicular to the raypath from the target to the geophone.

Figure 2:
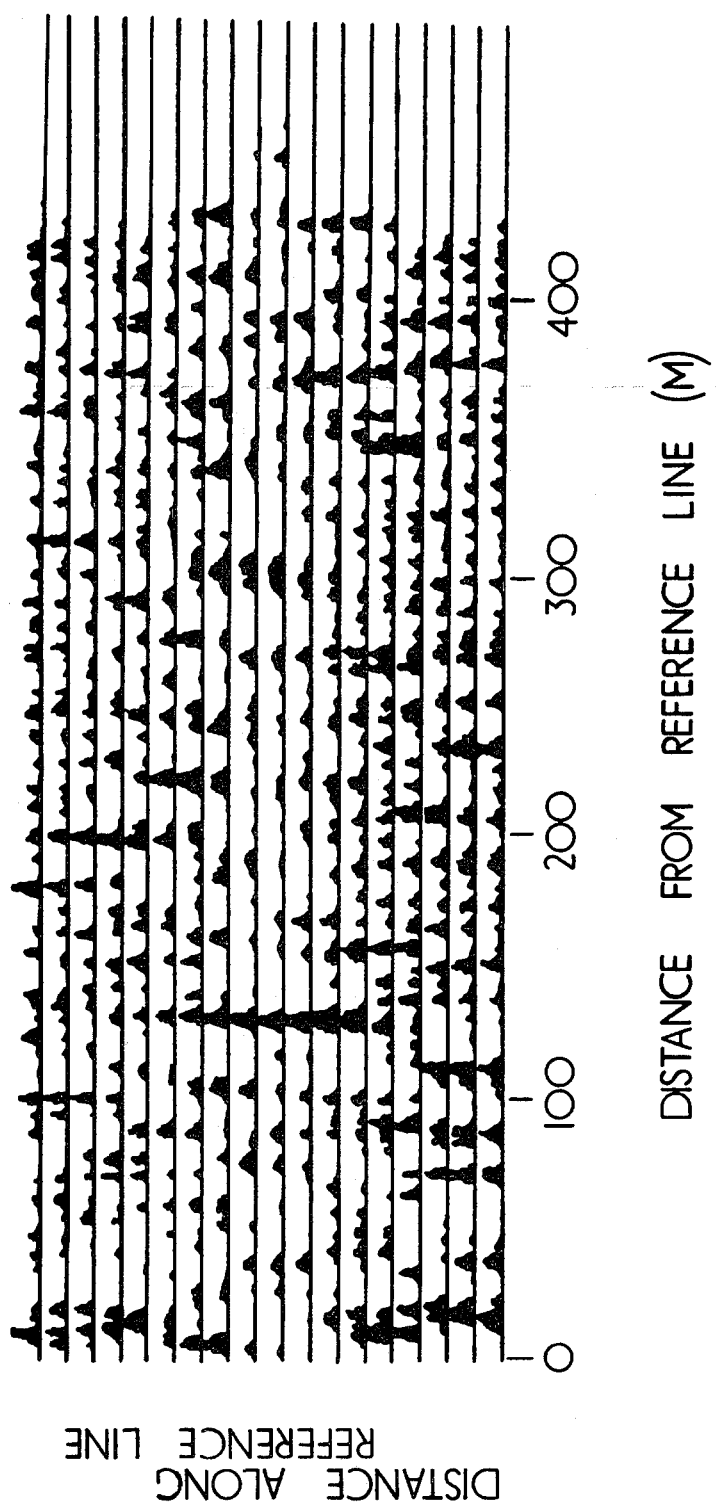
Figure 3:
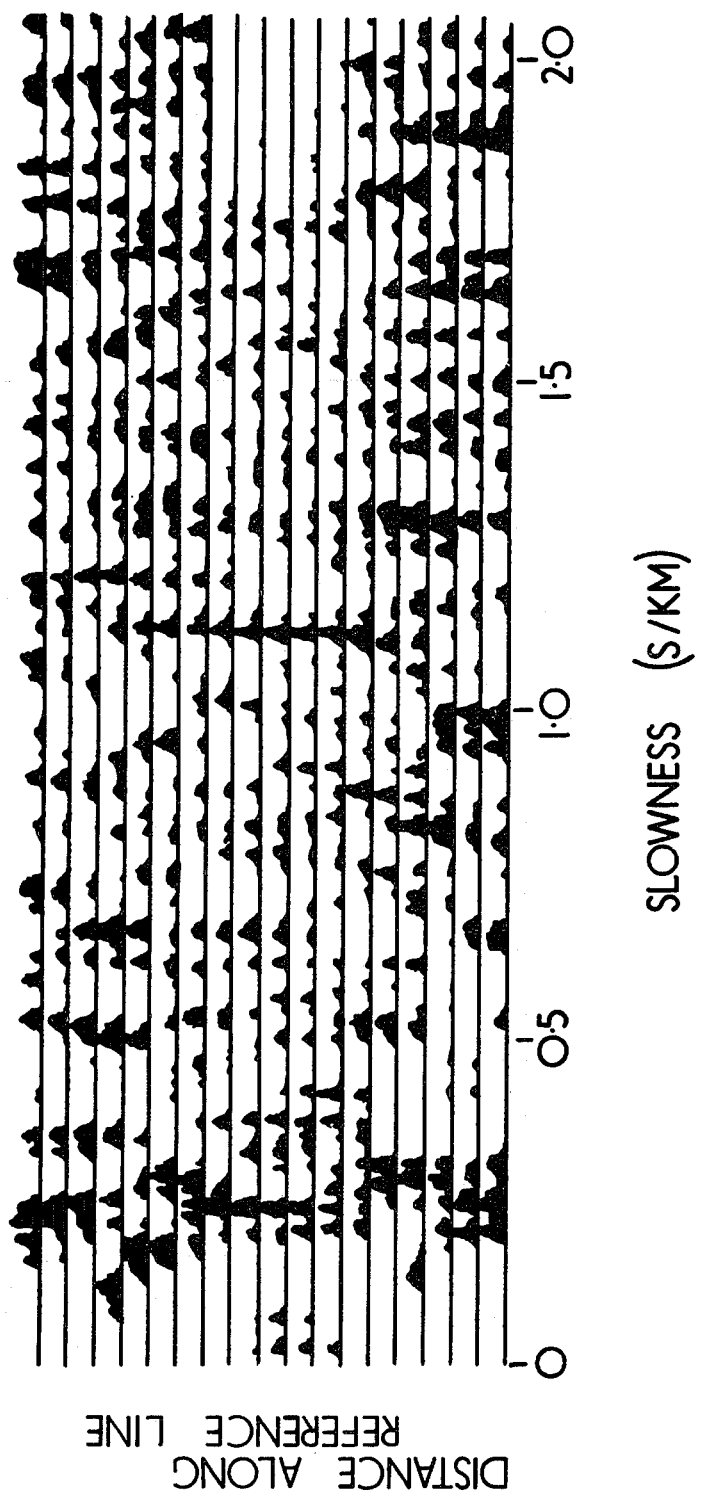

Referring now to FIGS. 2 and 3, these are DTG stacked sections of actual reflection data filtered at a centre frequency of 400 Hz. FIG. 2 is a distance-distance section using a velocity of 900 m/s. A prominent reflector at a distance of 130 m from the reference line across the central half of the section can be seen. FIG. 3 is the complementary distance-slowness section assuming a reflector at 130 m. Not surprisingly, a reflected mode at 1.1 s/km (900 m/s) is apparent. However, no other modes appear to be reflected. These results have been verified by subsequent mining operations.

It will be appreciated that the method of the invention improves the signal to noise ratio at target reflectors which occur at any angle to the shot-detector array and that and convenient arrangement of shots and detectors can be used without any complex field technique being necessary. Furthermore field techniques can be easily designed to optimise the DTG stack for targets at any specific angle and DTG can be used on either transmission or reflection data, with or without mode conversion.

The invention can also be used for velocity analysis and can operate successfully in cases where the group and phase velocities are different. DTG can combine traces from two-component geophones to image with a resultant signal in any direction.

Although described heretofor in seam applications, the use of the procedure is not restricted to this and could be applied to surface seismology.

While the invention has been described with reference to a specific embodiment, the exact nature and scope of the invention is defined in the following claims.

We claim:

1. A method of stacking seismological data to identify a fault in a geological seam including the steps of arranging shots and detectors in a seam or the surrounding strata, firing the shots sequentially and detecting any reflections thereof with the detectors, and selecting from the seismic traces those having a common reflection point, wherein a target is divided into a number of equal length segments and each trace is assigned to the segment which contains the point at which reflections would occur, traces belonging to the same line segment being stacked after applying a move out correction according to the formula:

$$P^2 = x_1^2 + x_2^2 + 2x_1x_2 \cos 2\theta + 4L^2 + 4L(x_1 - x_2) \sin \theta$$

in which P is the distance travelled by seismic signal emanating at a shot, reflecting at a point on a reflector where specular reflection occurs, and being received at a detector;

$\theta$ is the angle between shot-detector line and the reflector;

L is the length of a line extending perpendicularly from the reflector to a point of origin on the shot-detector line;

$x_1$ is the distance between the shot and the point of origin;

$x_2$ is the distance between the detector and the point of origin.

2. A method as claimed in claim 1 in which the stack is carried in a distance-distance space.

3. A method as claimed in claim 1 in which the stack is carried out in a distance-slowness space.

4. A method as claimed in claim 1 in which the shot-detector line is chosen as being parallel to a target.

5. A method of stacking seismological data to identify a fault in a geological seam including the steps of arranging shots and detectors in a seam or the surrounding strata, firing the shots sequentially and detecting any reflections thereof with the detectors, and selecting from the seismic traces those having a common reflection point, wherein a target is divided into a number of equal length segments and each trace is assigned to the segment which contains the point at which reflections would occur, and wherein mode conversion occurs and in which a mode conversion point is fixed by selecting a point as a target reflector line between perpendiculars to the line giving the source and receiver, comparing the ratio the sines of the angles of incidence and reflection with the ratio of velocities to determine which side of the midway point the conversion point lies and repeating this comparison for the half of the reflection line selected successively until a small enough segment is reached.

6. A method of stacking seismological data to identify a fault in a geological seam including the steps of arranging shots and detectors in a seam or the surrounding strata, firing the shots sequentially and detecting any reflections thereof with the detectors, and selecting from the seismic traces those having a common reflection point, wherein a target is divided into a number of equal length segments and each trace is assigned to the segment which contains the point at which reflections would occur, and wherein the traces belonging to the same line segment are stacked in a distance-distance space.

7. A method of stacking seismological data to identify a fault in a geological seam including the steps of arranging shots and detectors in a seam or the surrounding strata, firing the shots sequentially and detecting any reflections thereof with the detectors, and selecting from the seismic traces those having a common reflection point, wherein a target is divided into a number of equal length segments and each trace is assigned to the segment which contains the point at which reflections would occur, and wherein the traces belonging to the same line segment are stacked in a distance-slowness space.

* * * * *